UNITED STATES PATENT OFFICE.

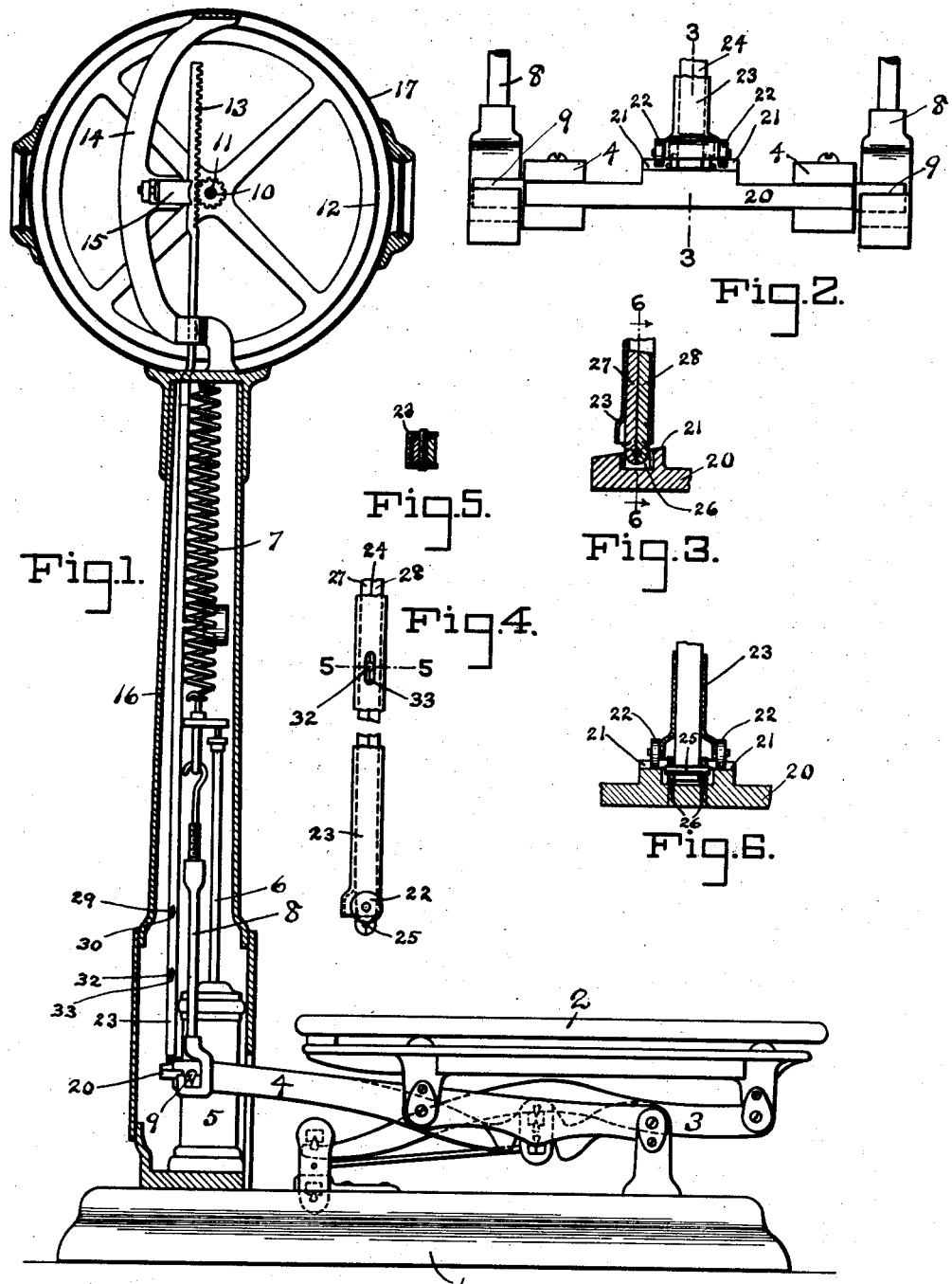

BERT W. KING, OF DETROIT, MICHIGAN, ASSIGNOR TO STANDARD COMPUTING SCALE COMPANY, LIMITED, OF DETROIT, MICHIGAN, A LIMITED PARTNERSHIP.

SCALE.

1,091,664.      Specification of Letters Patent.      Patented Mar. 31, 1914.

Application filed November 9, 1912. Serial No. 730,370.

*To all whom it may concern:*

Be it known that I, BERT W. KING, a citizen of the United States, and a resident of Detroit, in the county of Wayne and State of Michigan, have invented a new and useful Scale, of which the following is a specification.

This invention relates to means adapted to be connected to the rod extending between the load support and the indicating mechanism of weighing scales, and its object is to so modify the action of the weight-indicator that the variations in expansion and contraction in the weight-resisting springs resulting from changes in temperature will be compensated.

It further consists in providing a controlling device of this kind which will not be influenced by the load on the scale.

This invention consists in a thermostat so connected to the lever mechanism and to the rod extending between the weight-indicator and the lever mechanism as to cause the effective action of the lever mechanism on the weight-indicator to be varied inversely with the changes in temperature.

In the accompanying drawings Figure 1 is a vertical section of the indicating mechanism and the pedestal for supporting the same, showing the load-resisting springs, the load-supporting lever mechanism and the thermostat for controlling the connection between the indicating mechanism and the load support. Fig. 2 is an end elevation of the load supporting lever mechanism and the lower end of the connector between the same and the indicating drums, as seen from the left in Fig. 1. Fig. 3 is a section on the line 3—3 of Fig. 2. Fig. 4 is an elevation of the lower end of the connector between the indicating drums and the lever mechanism. Fig. 5 is a section on the line 5—5 of Fig. 4. Fig. 6 is a section on the line 6—6 of Fig. 3.

Similar reference characters refer to like parts throughout the several views.

It has long been known that the springs of spring scales lose a portion of their stiffness as they become warmer, and that the initial length of these springs increases and decreases with the temperature. It has further been known that with each change of temperature the indicating mechanism must be adjusted so that the "zero" on the indicator will be in line with the pointer or other indicator when the scale is unloaded. The scale mechanism shown in the accompanying drawings is of well known construction and has been shown only for the purpose of indicating how this improved thermostat can be applied to this type of scale, it being understood that it is readily applicable to all types of scales wherein a generally horizontal lever is connected to an indicating device by means of a vertically movable rod.

The base 1, the load support comprising the platform 2 and levers 3 and 4, the dashpot 5, piston-rod 6, spring 7, connecting yoke 8 engaging the knife-edges 9, indicator shaft 10 carrying the gear 11 and drum 12, rack-bar 13 supported by the bracket 14 and guide 15, the shell 17 carrying this bracket, and the pedestal 16 are all of well known construction and need not be further described, except to indicate, that the rear end of the lever 4 descends with the platform 2, but at greater speed.

Mounted in the bifurcated rear end of the lever 4, as shown in Fig. 2, is a cross-bar 20 which carries two inclined bearing surfaces 21 on which the small wheels 22 on the lower end of the rod 23 rest. This rod 23 and the rack-bar 13 connected thereto are of sufficient weight to turn the shaft 9, gear 10 and drum 11. Therefore these wheels 22 will always rest on these inclines 21. This rod 23 is in the form of a channel at its lower end and receives a thermostat 24 formed of two metals having unequal expansions, steel and brass preferred, and firmly secured together, which thermostat is provided with a pin 25 which extends through lugs 26 on the cross-bar 20, as shown in Fig. 6. The brass outer bar 27 of this thermostat expands more than the steel inner bar 28.

The thermostat 24 is provided with a cross-pin 29 at its upper end which extends through a slot 30 in the channel part of the rod 23 and with the intermediate third pin 32 which extends through a slot 33 in this channel. The operation of this thermostat is as follows: As the temperature increases, the bar 28 will increase in length faster than the bar 27, and as a result the thermostat will be curved inwardly, that is, to the right in Fig. 1. As the lower end of this thermostat is fixed by reason of the pin 25, the result of this movement will be to move the lower end of the bar 24 and the small wheels 22 to the right in Fig. 1, thus not only shortening that arm of the lever 4 which actuates the indicating mechanism but also moving these wheels 22 up the inclines 21 and thus turning back the drums 11. This turning back of the drums 11 compensates for the initial lengthening of the springs due to the increased temperature. As the temperature falls, the bar 27 decreases in length at a slower rate than the bar 28, resulting in the thermostat going outwardly and in the lower end of the connecting bar 24 moving toward the end of the lever. The indicating drums will therefore turn greater distances in proportion to the expansion of the springs when the temperature is low than when it is high. This change in the operative length of the arm of the lever 4 will compensate for the expansion of the springs through all changes of temperature. The change in length of the springs when no load is on the platform is compensated by the movement of the lower end of the connecting rod 24 up or down the inclines 21. This construction is so simple and effective that it can be predetermined for any design of scales after the expansion of the springs and the action of the thermostat for given changes in temperature have been ascertained.

It will be understood that the load on the platform and the resistance of the springs have no effect on the operation of the thermostat as this compensating device connects to the rod 23 alone and the weight of this rod does not vary.

I claim.

1. In a scale, the combination of an indicating mechanism, a load-supporting lever and counterbalancing springs for the same and the load carried thereby, a connecting rod between the lever and the indicating mechanism, a thermostatic regulator in the form of a bar having one end connected to the lever and normally extending parallel to the connecting rod and operatively united thereto at a plurality of points to neutralize the variations in the effective action of the springs on the lever and indicator due to changes in temperature of the surrounding atmosphere, but so as to be uninfluenced in such action by the force exerted upon the springs.

2. In a scale, the combination of the indicating mechanism and a load-supporting lever, counterbalancing means for the lever and the load carried thereby, connections between the lever and the indicating mechanism including a bar whose lower end is U shaped in cross-section, and a regulator for shifting the lower end of said bar comprising a thermostatic bar pivotally connected at its lower end to the lever and extending up between the sides of said connecting bar and engaging therewith at a plurality of points.

3. In a scale, the combination of the indicating mechanism, counterbalancing springs, a weight supporting lever connected to said springs and having an inclined upper surface, a rod connecting to said indicating mechanism and extending down to said lever, an antifriction device on the lower end of said rod and resting on said inclined surface, and a thermostat pivotally connected at its lower end to said lever and extending upwardly parallel to said connecting bar and connected thereto both at the upper end and intermediate the ends of the thermostat.

4. In a scale, the combination of an indicating drum and an upright rod to turn the same, a weighing lever and weight resisting springs connected thereto, the lower end of the upright rod resting on the end of the lever and said end formed with an inclined surface, and a thermostat pivotally connected at one end to said lever, at its opposite end and intermediate its ends to said rod so that any variation in alinement of the thermostat will move the lower end of said rod along the inclined surface of the lever and change the position of said indicating drum.

5. In a scale, the combination of a base, pedestal and indicating drum at the upper end of the pedestal, weighing levers mounted on the base, one of the levers having a bifurcated rear arm extending into the pedestal, counterbalancing springs within the pedestal and a yoke connecting said springs to said bifurcated end of the rear arm of the lever, an upright rod connecting at its upper end to said drum and having its lower end resting on the lever, and a thermostat bar connected at its lower end to said lever and at its upper end to said rod so that any change in the alinement of the thermostat will move the lower end of the connecting rod on the lever to neutralize the variations in the effective action of said springs due to changes in temperature of the surrounding atmosphere.

6. In a scale, the combination of the indicating drum and an upright rod to turn the same, a weighing lever and weight-resisting mechanism connected thereto, the lower end of the upright rod resting on the end of the lever, and a thermostat pivotally connected at one end to said lever, at its opposite end and intermediate its ends to said rod so that any variation in alinement of the thermostat will move the lower end of said rod along the lever.

In testimony whereof I have signed this specification in the presence of two subscribing witnesses.

BERT W. KING.

Witnesses:
HENRY E. VILLEROT,
GLENN VAN RIPER.